United States Patent [19]

Howes et al.

[11] Patent Number: 5,353,259
[45] Date of Patent: Oct. 4, 1994

[54] VOICE MESSAGE RECOVERY SYSTEM AND METHOD

[75] Inventors: Simon L. Howes, Monroe; Regina J. Kuhnen, Meriden, both of Conn.

[73] Assignee: Dictaphone Corporation, Stratford, Conn.

[21] Appl. No.: 901,470

[22] Filed: Jun. 19, 1992

[51] Int. Cl.⁵ .............................................. G11B 19/02
[52] U.S. Cl. ........................................ 369/25; 379/89; 379/75
[58] Field of Search ................. 369/25, 26, 29, 27; 379/75, 88, 89, 76

[56] References Cited

U.S. PATENT DOCUMENTS

| | | | |
|---|---|---|---|
| 4,332,021 | 5/1982 | Plunkett, Jr. | 369/26 |
| 4,468,751 | 8/1984 | Plunkett, Jr. | 369/29 |
| 4,581,486 | 4/1986 | Matthews et al. | 379/89 |
| 4,761,807 | 8/1988 | Matthews et al. | 379/89 |
| 4,935,954 | 6/1990 | Thompson et al. | 379/89 |
| 4,975,914 | 12/1990 | Ashton et al. | 371/11.2 |
| 5,003,575 | 3/1991 | Chamberlin et al. | 379/89 |
| 5,031,218 | 7/1991 | Galand et al. | 360/48 |
| 5,033,077 | 7/1991 | Bergeron et al. | 379/67 |
| 5,036,533 | 7/1991 | Carter et al. | 379/88 |
| 5,153,905 | 10/1992 | Bergeron et al. | 379/88 |

*Primary Examiner*—Robert J. Pascal
*Assistant Examiner*—Tan Dinh
*Attorney, Agent, or Firm*—Peter Vrahotes; Melvin J. Scolnick

[57] ABSTRACT

This invention relates to a communication system and method wherein messages are transmitted and stored in voice mail boxes. The system and method provide the ability on the part of an author to recover a message before access to the message by a recipient. This allows the author to recoup a message in case the message is sent accidentally to the wrong recipient or the message has been sent to a recipient who no longer has access to the message.

5 Claims, 2 Drawing Sheets

VOICE MESSAGE RECOVERY SYSTEM AND METHOD

BACKGROUND OF THE INVENTION

There are many systems commercially available whereby voice messages can be sent to designated recipients. These are commonly known as voicemail systems wherein each author or subscriber, is assigned a section of a disk called a mailbox in which the author's messages are stored. When one subscriber, the author, sends a message to another subscriber, the recipient, that message is delivered to the recipient's mailbox and is read the next time the recipient logs into the system. Such a system is shown and described in co-pending patent application Ser. No. 07/689,138 entitled PRIORITY VOICE MESSAGE DELIVERY SYSTEM.

After a recipient logs onto the system and accesses a message, he may leave the message in the mailbox for future reference or cancel the message. Once a message has been placed into the mailbox of a recipient, the author no longer has any control over that message and there is no way the recipient can be prevented from having access to the message if a mistake has occurred.

There are times when messages are sent and it is subsequently learned that a mistake has occurred. Either the message is sent to the wrong recipient or the recipient to whom it is sent is no longer a subscriber and does not have access to the system. With present systems, there is no mechanism whereby situations of this type can be rectified.

Clearly it would be advantageous to provide a system and method whereby voicemail messages can be retrieved by an author or sender.

SUMMARY OF THE INVENTION

In the apparatus and method of the instant invention, a subscriber not only owns a section of a disk which is designated as a access section, but also owns another section of the disk that is termed the pending section. The receiver's pending section may contain messages that are ready to be delivered but not yet accessed. When a recipient logs onto the system, his pending section is scanned for messages. If any is found, the message is at that time transferred, or delivered, from the recipient's pending section to the recipient's access section.

When a sender wishes to intercept, or retrieve, a previously sent message, the system will ask the sender to enter the identity of the recipient to whom the message was sent. Based on the entered I.D., the system will search the recipient's pending section for messages sent to the designated recipient. Any message that has not been accessed by a recipient can then be cancelled by the sender. If the recipient has logged onto the system, then the message can no longer be retrieved by the sender.

DETAILED DESCRIPTION OF THE PREFERRED EMBODIMENT

Figure 1:
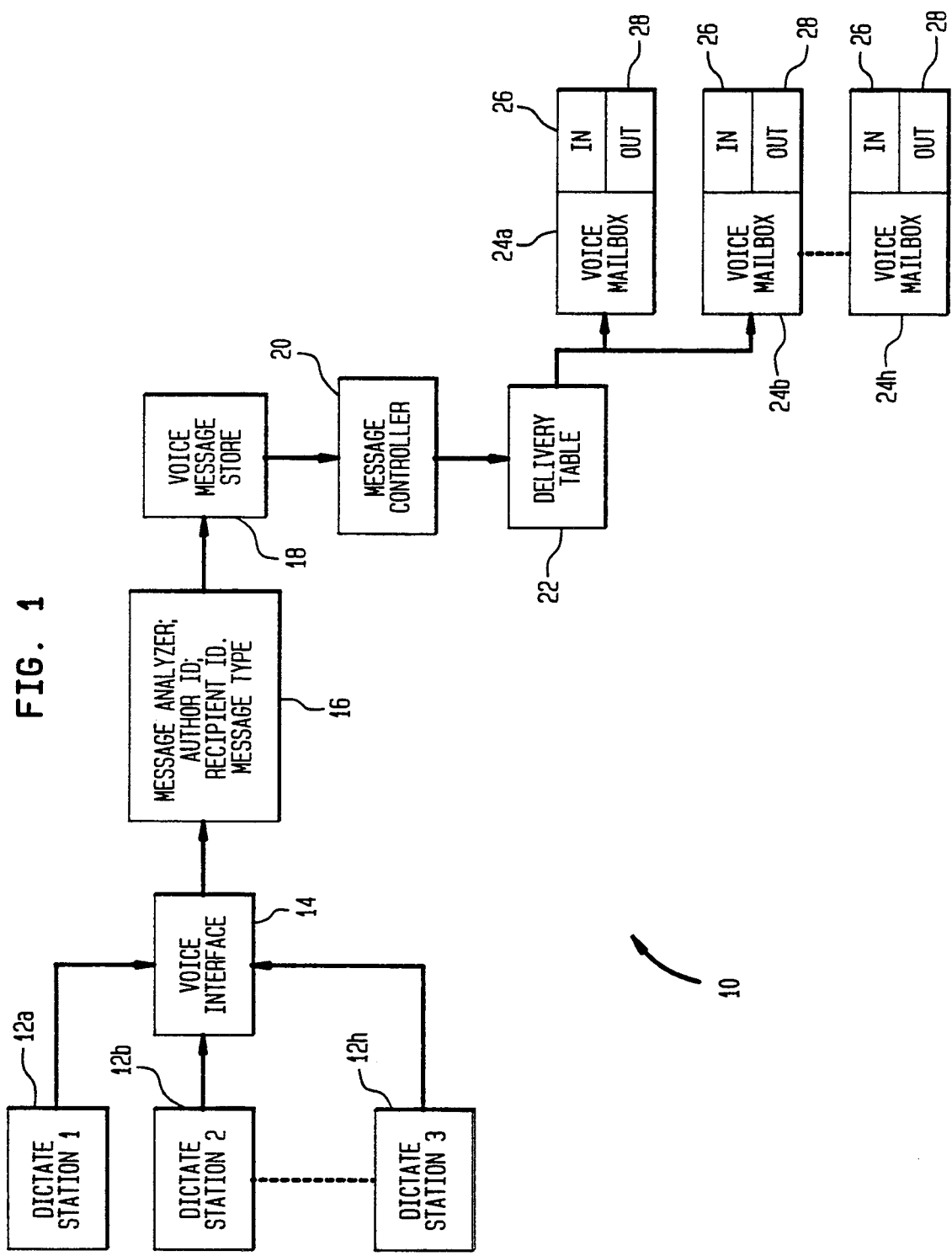
FIG. 1 shows a block diagram of a system in which the instant invention can be carried out.

With reference to FIG. 1 a voicemail system is shown generally at 10 in which the instant invention can be practiced. A plurality of dictation stations 12a, 12b, . . . 12n are shown in communication with a voice interface 14 which serves the function of converting analogue signals to digital signals. The voice interface 14 is in communication with a message analyzer 16 that has stored therein the identification of the subscribers of the system 10 and the types of messages that can be transmitted. The voice message analyzer 16 is a communication with a voice message store 18 which creates a message file. The voice message store 18 is in communication with a message controller 20 where the speech is recorded and manipulated if necessary. The voice message controller 20 is in communication with a delivery table 22 which acts as a temporary storage during transmission of messages and is in turn in communication with a plurality of voice mailboxes 24a, 24b . . . 24n. The delivery table 22 determines to which of the voice mailboxes 24a, 24b . . . 24n a message is to be sent and delivers such message accordingly. Each mailbox 24a, 24b . . . 24n has two sections, a pending box section 26 and a mailbox section 28.

Everything that has been described relative to the system 10 is well known with the exception of the pending section 26 of the voice mailboxes 24. An example of such a system is Digital Express ® 7000 voice mail system available from Dictaphone Corporation.

In operation, a sender of a message logs on through one of the dictation stations 12 and and delivers a message to the message analyzer 16 giving his identification, the identification of the recipient, and the type of message being sent. The voice message store 18 will receive the voice message from the message analyzer 16 which will then create a message file and pass this message file onto the message controller 20 where the speech is recorded and manipulated if necessary. Upon completion of the recording and manipulation by the message controller 20, the message is then passed onto the delivery table 22 which will determine which of the voice mailboxes 24 is to receive the voice message. Initially, the voice message will be placed into the recipient's pending section 26 of the voice mailbox 24.

If a sender wishes to intercept and retrieve a previously sent message, the sender will identify himself to the message analyzer 16 and identify the party to whom the message was sent. Based on the entered IDs, the system will search the recipient's pending section 26 for the message. Upon identification of the message in the pending section 26, the message can be retrieved by the sender. On the other hand, if the recipient had logged in previously, the message would have been sent from the recipient's pending section 26 to accessible section 28 of the recipient.

By way of example, assume the sender creates a message A and sends it to the recipient. In this circumstance, the recipient's accessible section 28 will be empty and the recipient's pending section 26 will contain the message. Upon the recipient logging onto the system, the recipient's pending section is emptied of message A and the system will move the message from the recipient's pending section 26 to the recipients accessible section 28. At this point, the recipients accessible section 28 contains the message and may be accessed by such recipient. If the sender were to attempt to invoke a message recovery signal to the recipient's pending section 26 nothing would occur.

In another circumstance, a sender creates a message B and sends it to the recipient. The recipient's accessible section 28 is empty and the recipient's pending section 26 contains message B. The sender invokes a message recovery for message B. The message will be transferred from the recipient's pending section 26 to the sender's accessible section 28 where it can be accessed by the sender and deleted if so desired.

Figure 2:
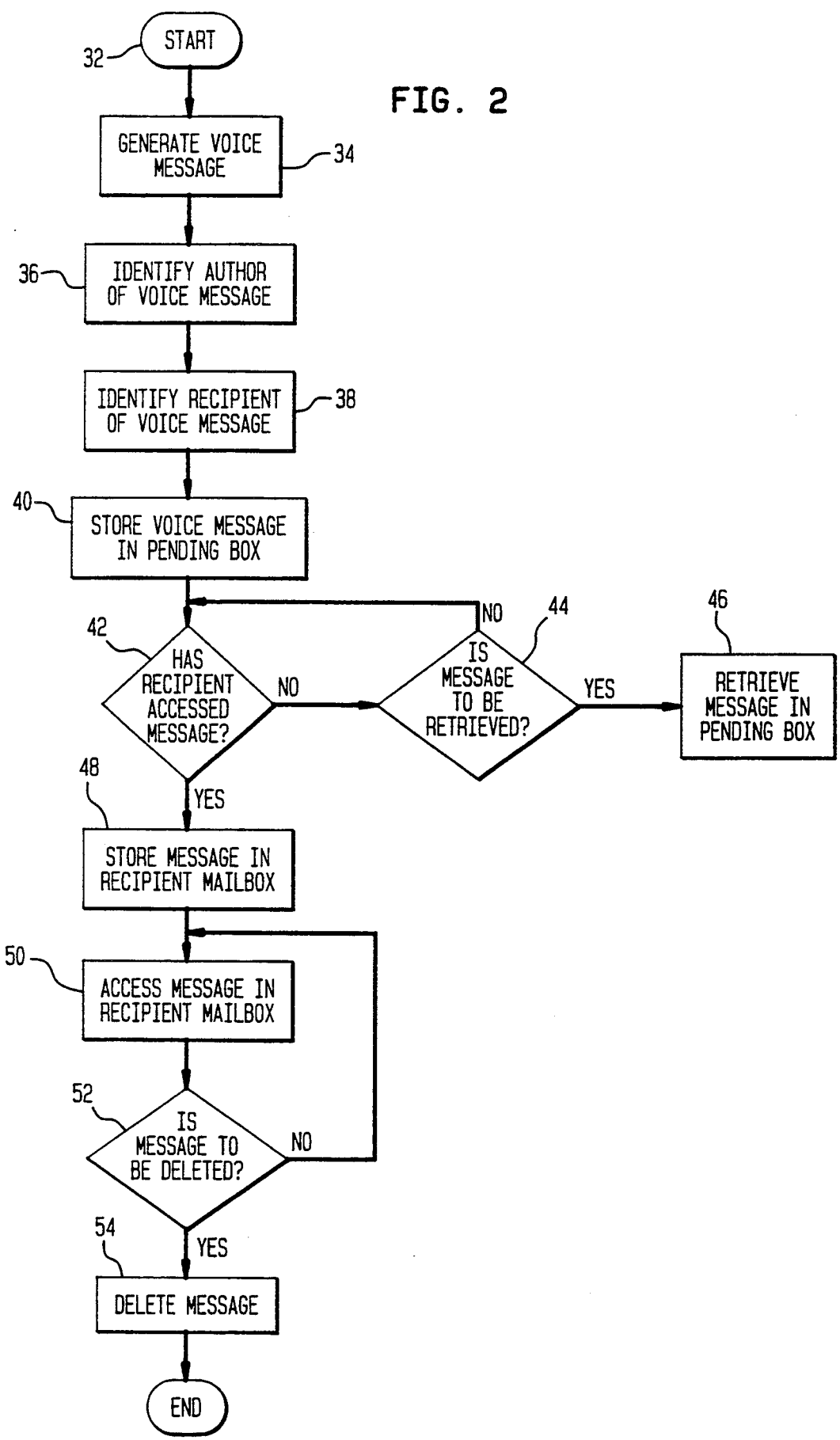
FIG. 2 shows a flow chart that represents the program for carrying out the method of the invention.

With reference to FIG. 2, the program for performing the invention will be described in conjunction with the flow chart shown therein. The system is initiated 32, a voice message is generated 34, the author's identification 36 and the recipient's identification 38 are entered. The voice message is stored 40 in the identified recipient's pending section. An inquiry is made whether the recipient has logged on 42. If not, an inquiry is made 44 whether the sender wishes to retrieve the stored message. If no, the system loops, but if yes the message is retrieved 46 and becomes available to the sender.

If the recipient has logged on, the voice message is transferred 48 to the recipient's accessible section. The recipient then can access 50 his accessible section to receive the message. An inquiry is then made 52 whether the message should be deleted. If no, the system loops, but if yes, the message is deleted 54 and the process ends.

Thus what has been shown and described is a system and a method whereby a sender of a voice message can recover the message so that it is not available to the recipient if the sender finds that an error has been made and the sender does not wish the recipient to have access to the message.

The above embodiment has been given by way of illustration only and other embodiments of the instant invention will be apparent to those skilled in the art from consideration of the detailed description and the attached drawing. Accordingly, limitations on the instant invention are to be found only in the claims.

What is claimed is:

1. A voice processing system comprising:
   means for generating a voice message,
   voice mailbox means having a pending section and an accessible section in communication with said voice message generating means,
   means for storing a voice message in said pending section,
   means for logging onto said voice mailbox and transferring a voice message in said pending section to said accessible section,
   means for deleting a message in said pending section through said voice message generating means if said voice message had not been transferred to said accessible section.

2. The system of claim 1 further including means for deleting a voice message said accessible section.

3. A voice processing system for a plurality of subscribers, comprising:
   a) a dictation station,
   b) a message analyzer in communication with said dictation station,
   c) a voice message store in communication with said message analyzer,
   d) a message controller in communication with said voice message store,
   e) a subscriber voice message store having a voice mailbox with a pending section and an accessible section, and
   f) means for transferring a voice message in said pending section to said accessible section.

4. The voice processing system of claim 3 wherein said means for transferring includes transferring a voice message from a voice message recipient's pending section to a voice message recipient's voice accessible section.

5. In a method of voice processing using a voice message delivery system having a plurality of voice mailboxes, the steps comprising:
   a) creating a recipient's pending section in each of said voice mailboxes,
   b) generating a voice message,
   c) identifying the sender of the voice message,
   d) identifying the recipient of the voice message,
   e) storing the voice message in a recipient's pending section of a voice mailbox,
   f) allowing the sender to retrieve a voice message from the recipient's pending section,
   g) transferring a voice message from the recipient's pending section to an accessible section of the recipient's voice mailbox upon the recipient accessing his voice mailbox, and
   h) denying access of a voice message to the sender after transfer of the voice message to the recipient's accessible section.

* * * * *